United States Patent
Chauvot et al.

(10) Patent No.: US 12,208,742 B2
(45) Date of Patent: Jan. 28, 2025

(54) METHOD FOR ADAPTING TO A DRIVER POSITION AN IMAGE DISPLAYED ON A MONITOR

(71) Applicant: Volvo Truck Corporation, Gothenburg (SE)

(72) Inventors: Pierre-Yves Chauvot, Meyzieu (FR); Thibaut Jeanpierre, Lyons (FR)

(73) Assignee: VOLVO TRUCK CORPORATION, Gothenburg (SE)

(*) Notice: Subject to any disclaimer, the term of this patent is extended or adjusted under 35 U.S.C. 154(b) by 110 days.

(21) Appl. No.: 17/794,785

(22) PCT Filed: Jan. 23, 2020

(86) PCT No.: PCT/EP2020/051680
§ 371 (c)(1),
(2) Date: Jul. 22, 2022

(87) PCT Pub. No.: WO2021/148126
PCT Pub. Date: Jul. 29, 2021

(65) Prior Publication Data
US 2023/0116267 A1  Apr. 13, 2023

(51) Int. Cl.
*B60R 1/28* (2022.01)
*B60R 1/26* (2022.01)
*H04N 5/262* (2006.01)
*H04N 23/90* (2023.01)

(52) U.S. Cl.
CPC .......... *B60R 1/28* (2022.01); *B60R 1/26* (2022.01); *H04N 5/2628* (2013.01); *H04N 23/90* (2023.01); *B60R 2300/30* (2013.01); *B60R 2300/8066* (2013.01)

(58) Field of Classification Search
None
See application file for complete search history.

(56) References Cited

U.S. PATENT DOCUMENTS

| | | | |
|---|---|---|---|
| 10,116,873 B1* | 10/2018 | Campbell | G06V 40/18 |
| 2008/0195285 A1* | 8/2008 | Shimizu | B62D 15/027 701/45 |
| 2016/0159320 A1* | 6/2016 | Andreen | B60R 22/48 382/103 |
| 2016/0212354 A1* | 7/2016 | Corcoran | H04N 7/181 |
| 2016/0280136 A1 | 9/2016 | Besson | |
| 2018/0312114 A1 | 11/2018 | Inoue | |
| 2019/0152418 A1* | 5/2019 | Coughlin | B60K 28/02 |

FOREIGN PATENT DOCUMENTS

| | | |
|---|---|---|
| EP | 1977929 A2 | 10/2008 |
| EP | 2218606 A1 | 8/2010 |
| JP | 2004338517 A | 12/2004 |

OTHER PUBLICATIONS

International Search Report and Written Opinion of the International Searching Authority, PCT/EP2020/051680, mailed Aug. 31, 2020, 9 pages.

* cited by examiner

*Primary Examiner* — Rebecca A Volentine
(74) *Attorney, Agent, or Firm* — Sage Patent Group

(57) ABSTRACT

The invention relates to a method and system for adapting to a driver position an image displayed on a monitor in a cab of the vehicle. The invention further relates to a vehicle including such a system. The invention is particularly well suited for heavy-duty vehicles, such as trucks, buses and construction equipment. The invention may also be used in other vehicles such as a car.

12 Claims, 3 Drawing Sheets

Fig. 5
Fig. 6a
Fig. 6b
Fig. 7
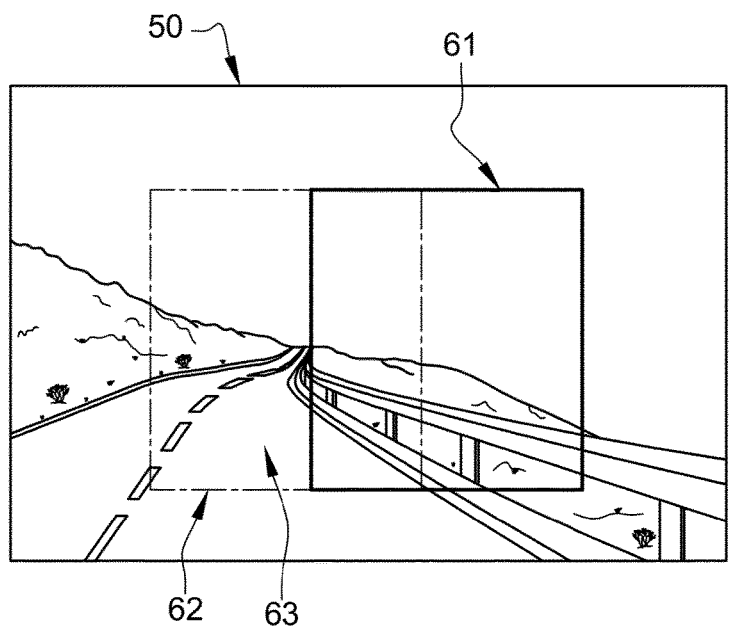
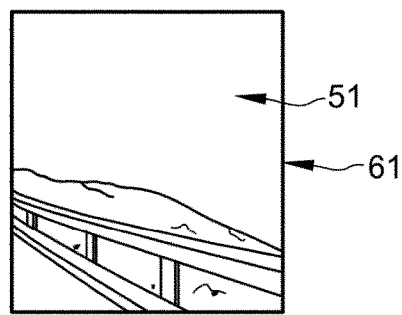
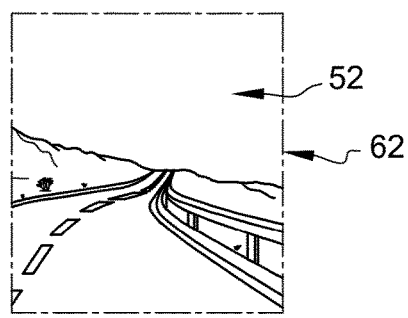
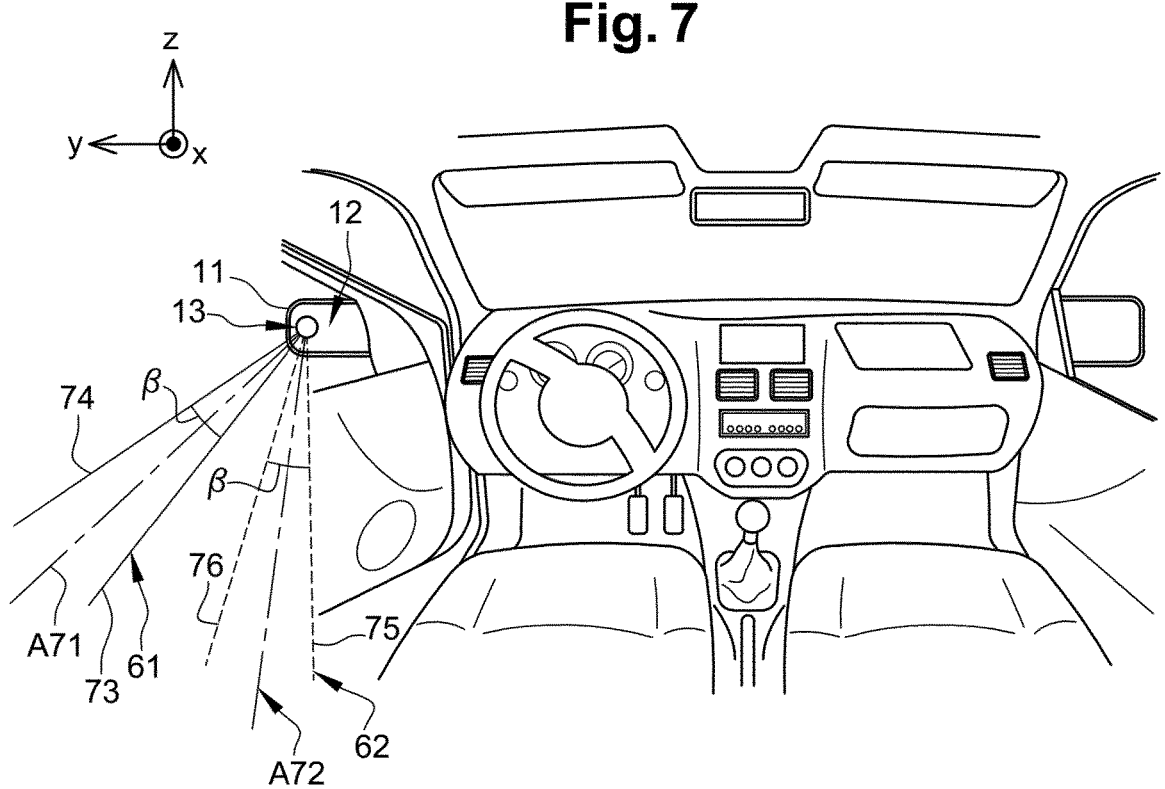

METHOD FOR ADAPTING TO A DRIVER POSITION AN IMAGE DISPLAYED ON A MONITOR

CROSS REFERENCE TO RELATED APPLICATIONS

This application is a 35 U.S.C. § 371 national stage application of PCT International Application No. PCT/EP2020/051680 filed on Jan. 23, 2020, the disclosure and content of which is incorporated by reference herein in its entirety.

TECHNICAL FIELD

The invention relates to a method and a system for adapting to a driver position an image displayed on a monitor in a cab of the vehicle. The invention further relates to a vehicle comprising such a system.

The invention is particularly well suited for heavy-duty vehicles, such as trucks, buses and construction equipment. The invention may also be used in other vehicles such as a car.

BACKGROUND

A trend in industrial vehicles is to replace conventional mirrors by a camera assembly which can comprise a supporting arm mounted on the vehicle cab and a camera arranged on said supporting arm, for providing a captured image of an area located rearwards and along a vehicle side. An image, resulting from the processing of the captured image, can typically be displayed on a monitor inside the driver's compartment.

The camera assembly must be arranged to provide to the vehicle driver an appropriate image displayed on the monitor, to ensure good visibility, hence safety.

However, the field of view of a camera assembly is fixed in that sense a camera differs drastically from a mirror as in a vehicle equipped with standard mirrors the driver can modify the vision field by moving his or her position on the vehicle seat to change the vision field and therefore, for example, minimise the occurrence of blind spot.

However, in a vehicle equipped with camera instead of rear mirrors, although the driver change position on the driver seat, the field of view is not modified meaning that the image displayed on the monitoring is also not modified.

This can be disturbing especially for an experienced driver who would typically anticipate certain driving conditions such as overtaking a vehicle by changing position to change the mirror field of view so as to minimise the occurrence of a blind spot.

SUMMARY

An object of the invention is to provide an easy-to-implement solution to improve the visibility for a vehicle's driver, without affecting comfort and driver experience.

The object is achieved by a method for adapting to a driver position an image displayed on a monitor in a cab of the vehicle, the vehicle comprising a camera assembly comprising at least one camera, for providing a captured image of a field of view located rearwards and along a vehicle side.

The method comprises:
determining the position of the driver on the driver seat using at least one sensor located in a seat belt system; said seat belt system comprising a seat belt, a belt buckle, a shaft rotation and a return spring,
processing the captured image, according to the position of the driver on the driver seat, to display on the monitor the image displayed.

By the provision of the method for adapting to a driver position an image displayed on a monitor in a cab of the vehicle according to the present invention, the advantage is to provide an easy-to-implement method allowing an automatic adjustment of the image displayed on the monitor depending on the position of the driver on the driver seat. Additionally, this system is comfortable for the driver, less expensive than the systems of the prior art and the reaction time of this system is fast.

Preferably, the image displayed on a monitor is:
either a first image which corresponds to a part of the captured image defined by a first camera field of view, in case the position of the driver is in a first configuration, i.e. an initial position of the driver on the seat,
or a second image which corresponds to a part of the captured image defined by a second camera field of view, distinct from the first field of view, in case the position of the driver is in a second configuration, i.e. any driver position different from the initial position.

Preferably, the at least one sensor is an optical sensor, a load sensor or a lap counter.

Preferably, the at least one sensor is located on the seat belt, in the belt buckle, in the rotation of a shaft and/or in the return spring.

Advantageously, the camera assembly comprises at least one camera arranged on a supporting arm mounted on at least one side of the vehicle and/or at least one camera arranged at the back of the vehicle.

Preferably, the second field of vision comprises a portion of the captured image that is located at any other place other than the first field of vision.

Preferably, the second field of vision further includes the first of vision. For example, the second image can correspond to a zoom out or a zoom in of the first image.

According to a second aspect, the invention relates to a system for adapting to a driver position an image displayed on a monitor in a cab of the vehicle, the vehicle comprising a camera assembly for providing a captured image of an area located rearwards and along a vehicle side, characterized in that the system comprises:
at least one sensor located in a seat belt system; said seat belt system comprising s seat belt, a belt buckle, a shaft rotation and a return spring,
a controller capable of receiving a driver position information from the at least one sensor, and of processing the captured image, according to said driver position information, to display on the monitor the image displayed.

According to a third aspect, the invention relates to a vehicle comprising:
a cab having front wheels and rear wheels;
a camera assembly for providing a captured image of an area located rearwards and along a vehicle side;
a monitor located in the cab, for displaying an image based on the captured image;
a vehicle internal communication network;
characterized in that it further comprises a system according to the present invention, wherein the at least one sensor and the controller are linked by the vehicle internal communication network.

Preferably, the camera is fixed relative to the cab, in the use position. Thus, the difference between the displayed first image and second image cannot be obtained through movement of the camera assembly relative to the cab, for providing different positions of the camera. For example, in this embodiment, the supporting arm of the camera assembly is fixedly mounted on the cab (but can be folded along the cab side when the vehicle is stopped).

The first image may correspond to a first field of vision of the camera and the second image corresponds to a second field of vision of the camera, wherein, as seen along a transverse direction, the lower boundary of the second field of vision is shifted from the lower boundary of the first field of vision by an angle α comprised between 5 and 45°.

It has to be noted that, in case the camera is fixed relative to the cab, in the use position, the above first and second fields of vision are virtual. In other words, the camera has one real and unique field of vision. The first field of vision would be the field of vision of a virtual camera that would provide a captured image that would be identical to the first displayed image, without image processing for altering the geometrical parameters (size, position, etc.) of the image. Similarly, the second field of vision would be the field of vision of a virtual camera that would provide a captured image that would be identical to the second displayed image, without image processing for altering the geometrical parameters (size, position, etc.) of the image.

The first and second fields of vision can have substantially the same spanning angle β. The optical axis of the second field of vision can be shifted from the optical axis of the first field of vision by said angle α.

In an embodiment, the controller is part of a camera monitoring system including the camera assembly. In other words, in this embodiment, the controller is not the electrical control unit of the vehicle.

BRIEF DESCRIPTION OF THE DRAWINGS

With reference to the appended drawings, below follows a more detailed description of embodiments of the invention cited as examples.

In the drawings:

FIG. 5 shows the captured image as well as a first field of view corresponding to a first image displayed and a second field of view corresponding to a second displayed image;

FIGS. 6a and 6b respectively show the first image displayed and the second image displayed based on the captured image of FIG. 5;

FIG. 7 is a perspective view forward the interior of a vehicle, showing two different fields of vision for displaying two different images, according to an embodiment of the invention;

DETAILED DESCRIPTION OF EXAMPLE EMBODIMENTS OF THE INVENTION

Figure 1:
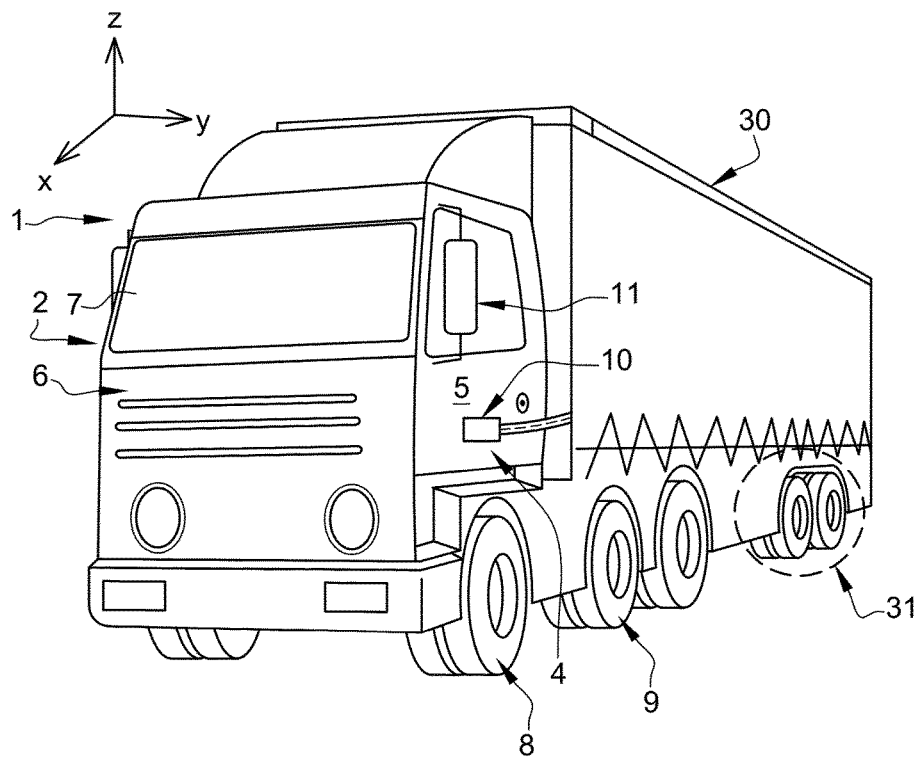
FIG. 1 is a perspective view of a vehicle according to the invention.

As illustrated in FIG. 1, the vehicle 1 comprises a cab 2 defining a driver's compartment 3. The cab 2 has side walls 4 each comprising a door 5 and a front wall 6 including a windscreen 7. The cab 2 further comprises front wheels 8, and rear wheels 9. There may be provided one rear wheel or several rear wheels on each side of the cab 2.

X is defined as the longitudinal direction of the vehicle 1, Y is defined as the transversal direction and Z is defined as the vertical direction of the vehicle 1.

The vehicle 1 may comprise an electrical control unit (ECU) 10 for controlling the various electric systems of the vehicle 1.

Figure 2:
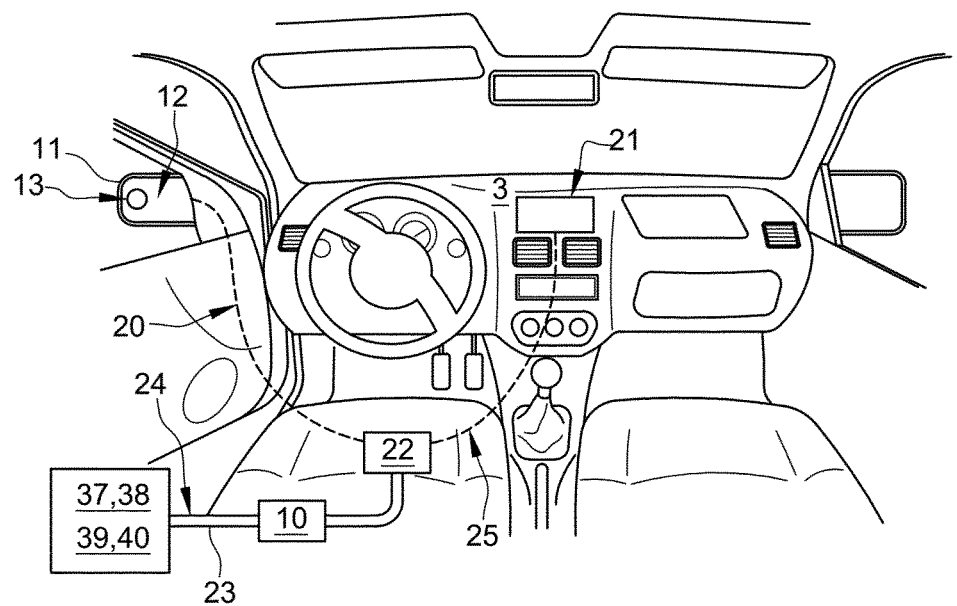
FIG. 2 is a perspective view forward from the interior of a vehicle, showing a camera assembly and a monitor for displaying an image based on the image captured by the camera assembly.

The vehicle 1 also comprises a camera assembly 11 mounted on the cab 2, typically above a front portion of the door 5, at least on the side wall 4 of the cab 2 adjacent the driver's seat. Basically, the camera assembly 11 can comprise a supporting arm 12 and a camera 13 arranged on said supporting arm 12, for providing a captured image 50 of an area surrounding the vehicle 1, more specifically an area located rearwards and along a vehicle side. The supporting arm 12 can be fixedly mounted on the cab 2, and can be equipped with a mechanism (not shown) allowing the camera assembly 11 to be:

either in a parking position, when not in use (typically when the vehicle 1 is stopped), in which the camera assembly 11 is folded against the cab side wall 4 to prevent damages;

or in a use position, in which the camera assembly 11 is protruding from the cab side wall 4, to allow the camera 13 to capture images (FIGS. 1 and 2).

Such a camera assembly 11 can typically be part of a so-called camera monitoring system (CMS) 20 which further includes a monitor 21 inside the driver's compartment 3 for displaying an image based on the captured image provided by the camera 13. Thus, the vehicle 1 according to the invention can be devoid of side exterior mirrors, and possibly also devoid of an interior mirror. The camera monitoring system 20 also includes a controller 22. The controller 22 can be connected to the ECU 10.

Moreover, the vehicle 1 may comprise a trailer 30 which can be mechanically and electrically connected to the cab 2, as shown in FIG. 1. The trailer 30 further has rear wheels 31.

The vehicle 1 also can also comprise a vehicle CAN bus 23. This network 23 includes electrical wiring 24 of the vehicle 1 configured to establish electric connection and communication between the cab 2, the seat belt system 32 and various vehicle components. The wiring 24 can typically be linked to the ECU 10.

According to the invention, the vehicle 1 comprises a system 25 for adapting an image displayed on the monitor 21, based on the captured image 50, to a driver configuration.

The system 25 comprises at least one sensor located in a seat belt system for determining the driver position.

Figure 3:
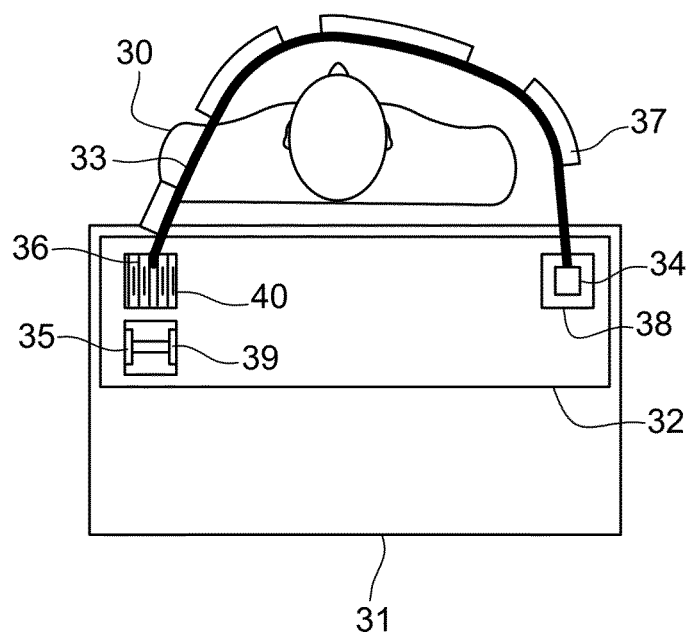
FIG. 3 is the position of the driver in the first configuration.

As shown in FIG. 3, the driver 30 is seated in a driver seat 31 comprising a seat belt system 32; said seat belt system 32 comprising a seat belt 33, a belt buckle 34, a shaft rotation 35 and a return spring 36. This example illustrates the use of four different sensors. The first sensor 37 is located on the seat belt 33. The first sensor may determine the position of the driver by detecting the driver weight distribution on the belt. The second sensor 38 is located in the belt buckle 34. The second sensor may determine the position of the driver by detecting the force induced by the position of the driver on the driver seat. The third sensor 39 is located in the shaft rotation 35. The third sensor may detect the unwinding length of the belt provided by the driver via the rotation of a shaft 35 on which the seat belt 33 can be wound. For example, the third sensor is a lap counter that determine the length of the sea belt by counting the number of rotation that the sea belt has performed between the first and the second configuration of the driver. The fourth sensor 40 is located in the return spring 36. The fourth sensor may detect the return force of the return spring 36 tensioned when the seat belt 33 is unrolled.

These sensors may be used in combination or independently from each other. By using at least one of this sensor, it is possible to detect to the position of the driver 30 in a first configuration, i.e. the initial position of the driver on the seat 31.

Figure 4:
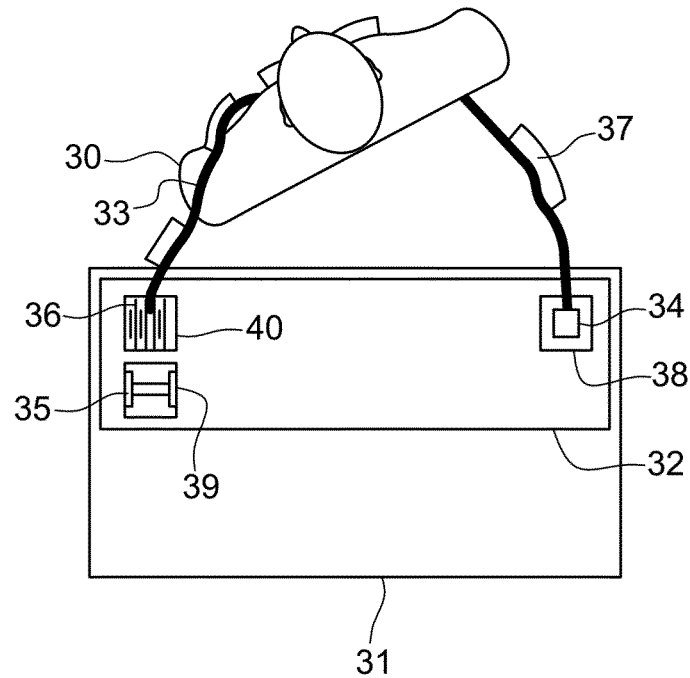
FIG. 4 is the position of the driver in the second configuration.

FIG. 4 shows the position of the driver is in a second configuration, i.e. any other position different from the first configuration. In this example, the driver is leaning forward to look at the dead angle as if the driver would do with an exterior rear mirror. One understands that by changing position from the first position to the second position, the driver weight distribution and/or the driver force distribution on the seat is altered. Additionally, the length of the belt and/or the return force of the return spring may be different.

Any of this change can be detected by the at least one the sensor 37, 38, 39, 40. Said sensors 37, 38, 39, 40 are linked to the controller 22 via the vehicle internal communication network 23 (more possibly via the bundle 24 of cables). The ECU 10 can possibly be arranged between the sensor(s) 37, 38, 39, 40 and the controller 22, as shown in FIG. 2, or otherwise functionally connected to both the sensor 37, 38, 39, 40 and the controller 22.

The controller 22, which is part of the system 25, is capable of receiving the driver configuration information from the sensor(s) 37, 38, 39, 40. Said information provided by the sensor(s) 37, 38, 39, 40 is either "the driver is in the initial position", i.e. the driver position is in the first configuration, or "the driver has changed its position", i.e. the driver position is in the second configuration.

According to the driver configuration determined by the sensor(s) 37, 38, 39, 40 and the corresponding information provided to the controller 22, the controller 22 automatically processes the captured image 50, to display on the monitor 21 a displayed image.

As illustrated in FIGS. 5, 6a and 6b, the image displayed on a monitor can be:
- either a first image 51 which corresponds to a part of the captured image 50 defined by a first camera field of view 61, in case the position of the driver is in a first configuration, i.e. an initial position of the driver on the seat,
- or a second image which 52 corresponds to a part of the captured image 50 defined by a second camera field of view 62, distinct from the first field of view, in case the position of the driver is in a second configuration, i.e. any driver position different from the initial position.

For that purpose, and because the camera 11 is preferably fixed relative to the cab 2, in the use position, the first image 51 displayed on the monitor 21 corresponds to a first field of vision 61 of the camera 13 as illustrated in FIG. 7 in solid lines, while the second image 52 displayed on the monitor 21 corresponds to a second field of vision 62 of the camera 13 as illustrated in FIG. 7 in dotted lines.

In practice, the camera 13 has one real and unique field of vision that includes at least the first field of vision 61 and the second field of vision 62 which are theoretically defined as follows. The first field of vision 61 would be the field of vision of a virtual camera which would provide a captured image that would be identical to the first image displayed 51, without image processing for altering the geometrical parameters (size, position, etc.) of the image. Similarly, the second field of vision 62 would be the field of vision of a virtual camera which would provide a captured image that would be identical to the second image displayed 52, without image processing for altering the geometrical parameters (size, position, etc.) of the image.

When seen along a transverse direction Y towards the vehicle 1, as in FIG. 7, the first field of vision 61 has an optical axis A71, a lower boundary 73 and an upper boundary 74. Similarly, the second field of vision 62 has an optical axis A72, a lower boundary 75 and an upper boundary 76.

So that the first image 51 can show a high area and the second image 52 can show a low area, the lower boundary 75 of the second field of vision 62 can be shifted from the lower boundary 73 of the first field of vision 61 by an angle α. This angle α can be comprised between 5 and 45°.

As a result, as seen in FIG. 5, the second field of vision 62—which defines the second image 52—comprises a portion 63 of the captured image 50 that is located on the left side of the first field of vision 61—which defines the first image 51.

According to an embodiment, illustrated in FIGS. 5, 6a, 6b and 7, the first and second fields of vision 61, 62 have substantially the same spanning angle β, and the optical axis A72 of the second field of vision 62 is shifted from the optical axis A71 that of the first field of vision 61 by angle α. In other words, the upper boundary 76 of the second field of vision 62 is also shifted from the upper boundary 74 of the first field of vision 61 by angle α.

As shown in FIGS. 5, 6a and 6b, this results in the second field of vision 62 being shifted relative to the first field of vision 61.

According to another embodiment (not illustrated), the first and second fields of vision 61, 62 have substantially the same optical axis, for example A71. Furthermore, the upper boundary 76 of the second field of vision 62 is upwardly offset from the upper boundary 74 of the first field of vision 61 by an angle α'. Angle α' can be comprised between 5 and 45°. It can be identical to angle α.

This results in the field of vision 62 including the whole first field of vision 61, as well as the above mentioned portion of the captured image 50 that is located below the first field of vision 61, and a portion of the captured image 50 that is located above the first field of vision 61. The second field of vision 62 may also comprise side portions outside and on each side of the first field of vision 61. In other words, the second image 52 is a zoom-out of the first image 51.

The method and the system according to the present invention detect any movement of the driver with the seat belt system. Without willing to be bound by any theory, it is believed that the image displayed on the monitor in the cab of the vehicle is automatically adjust allowing no disruption for the driver.

It is to be understood that the present invention is not limited to the embodiments described above and illustrated in the drawings; rather, the skilled person will recognize that many changes and modifications may be made within the scope of the appended claims

The invention claimed is:

1. A method for adapting to a driver position an image displayed on a monitor in a cab of a vehicle, the vehicle comprising a camera assembly comprising at least one camera, for providing a captured image of a field of view located rearwards and along a vehicle side, the method comprising:
   determining the position of the driver on the driver seat corresponding to a driver vision field using at least one sensor located in a seat belt system, said seat belt system comprising a seat belt, a belt buckle, a shaft rotation and a return spring; and processing the captured image, according to the position of the driver on the driver seat corresponding to the driver vision field, to display on the monitor the image displayed, the image being one of:
 a first image corresponding to a first part of the captured image defined by a first camera field of view, in response to the position of the driver being in a first configuration on the driver seat corresponding to a first driver vision field; and
 a second image corresponding to a second part of the captured image defined by a second camera field of view distinct from the first field of view, in response to the position of the driver being in a second configuration on the driver seat corresponding to a second driver vision field different from the first driver vision field.

2. The method according to claim 1, wherein the at least one sensor is an optical sensor, a load sensor or a lap counter.

3. The method according to claim 1, wherein the at least one sensor is located on the seat belt, in the belt buckle, in the shaft rotation and/or in the return spring.

4. The method according to claim 1, wherein the camera assembly comprises at least one camera arranged on a supporting arm mounted on at least one side of the vehicle and/or at least one camera arranged at the back of the vehicle.

5. The method according to claim 1, wherein the second field of view comprises a third portion of the captured image that is located outside the first field of view.

6. The method according to claim 5, wherein the second field of view further includes the first of view.

7. A system for adapting to a driver position corresponding to a driver vision field an image displayed on a monitor in a cab of the vehicle, the vehicle comprising a camera assembly for providing a captured image of an area located rearwards and along a vehicle side, the system comprising:
 at least one sensor located in a seat belt system; said seat belt system comprising a seat belt, a belt buckle, a shaft rotation and a return spring,
 a controller capable of receiving a driver position information from the at least one sensor, and of processing the captured image, according to said driver position information, to display on the monitor the displayed image,
 the displayed image being one of:
  a first image corresponding to a first part of the captured image defined by a first camera field of view, in response to the position of the driver being in a first configuration on the driver seat corresponding to a first driver vision field; and
  a second image corresponding to a second part of the captured image defined by a second camera field of view distinct from the first field of view, in response to the position of the driver being in a second configuration on the driver seat corresponding to a second driver vision field different from the first driver vision field.

8. A vehicle comprising:
 a cab having front wheels and rear wheels;
 a camera assembly for providing a captured image of an area located rearwards and along a vehicle side;
 a monitor located in the cab, for displaying an image based on the captured image;
 a vehicle internal communication network;
 a seat belt system comprising a seat belt, a belt buckle, a shaft rotation and a return spring; and
 a system for adapting to a driver position corresponding to the driver vision field the image displayed on the monitor, the system comprising:
 at least one sensor located in the seat belt system; and
 a controller capable of receiving a driver position information from the at least one sensor, and of processing the captured image, according to said driver position information, to display on the monitor the displayed image,
 the at least one sensor and the controller being linked by the vehicle internal communication network, and
 the image displayed on the monitor being one of:
  a first image corresponding to a first part of the captured image defined by a first camera field of view, in response to the position of the driver being in a first configuration on the driver seat corresponding to a first driver vision field; or
  a second image corresponding to to a second part of the captured image defined by a second camera field of view distinct from the first field of view, based on the position of the driver being in a second configuration on the driver seat corresponding to a second driver vision field different from the first driver vision field.

9. The vehicle according to claim 8, wherein the camera is fixed relative to the cab.

10. The vehicle according to claim 8, wherein, as seen along a transverse direction, a lower boundary of the second field of view is shifted from a lower boundary of the first field of view by a first angle between 5° and 45°.

11. The vehicle according to claim 10, wherein the first and second fields of view have substantially a same spanning angle, wherein an optical axis of the second field of view is shifted from an optical axis of the first field of view by said first angle.

12. The vehicle according to claim 8, wherein the controller is part of a camera monitoring system including the camera assembly.

* * * * *